United States Patent
Okawa et al.

(10) Patent No.: US 7,233,812 B2
(45) Date of Patent: Jun. 19, 2007

(54) DIRECTIONAL BEAM COMMUNICATION SYSTEM, DIRECTIONAL BEAM COMMUNICATION METHOD, BASE STATION AND CONTROLLER

(75) Inventors: Koichi Okawa, Yokohama (JP); Anil Umesh, Yokohama (JP); Shinya Tanaka, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 429 days.

(21) Appl. No.: 10/739,277

(22) Filed: Dec. 19, 2003

(65) Prior Publication Data

US 2004/0185783 A1    Sep. 23, 2004

(30) Foreign Application Priority Data

Dec. 19, 2002    (JP)    ............................ 2002-368865

(51) Int. Cl.
  *H04M 1/00*    (2006.01)
(52) U.S. Cl. ................. 455/562.1; 455/561; 455/452.1
(58) Field of Classification Search ............. 455/562.1, 455/561, 277.1, 452.1, 450, 453, 434, 560; 375/140, 130, 260; 370/208, 334
See application file for complete search history.

(56) References Cited

U.S. PATENT DOCUMENTS

| | | | |
|---|---|---|---|
| 5,889,494 A | | 3/1999 | Reudink et al. |
| 6,070,090 A | * | 5/2000 | Feuerstein .................. 455/561 |
| 6,397,082 B1 | * | 5/2002 | Searle ...................... 455/562.1 |
| 6,400,335 B1 | * | 6/2002 | Weaver et al. .............. 343/853 |
| 6,415,149 B1 | | 7/2002 | Bevan et al. |
| 6,480,524 B1 | * | 11/2002 | Smith et al. ................. 375/140 |
| 6,542,484 B1 | * | 4/2003 | Ovesjo et al. .............. 370/335 |
| 6,996,418 B2 | * | 2/2006 | Teo et al. ................. 455/562.1 |
| 7,039,441 B1 | * | 5/2006 | Reudink et al. ......... 455/562.1 |

FOREIGN PATENT DOCUMENTS

| | | |
|---|---|---|
| EP | 1 152 628 A1 | 11/2001 |
| WO | WO 00/51389 | 8/2000 |
| WO | WO 00/79809 A1 | 12/2000 |

* cited by examiner

*Primary Examiner*—Sanh D. Phu
(74) *Attorney, Agent, or Firm*—Oblon, Spivak, McClelland, Maier & Neustadt, P.C.

(57) ABSTRACT

The object of the present invention to provide a directional beam communication system whereby the beam width of a directional beam to be transmitted is reduced by sharing an array antenna among a plurality of adjacent sectors so as to increase the interference suppression effect. The directional beam communication system is configured to communicate with a mobile station MS located in a service area formed by a plurality of sectors S1 and S2 using a directional beam which is transmitted by an array antenna A including a plurality of antenna elements a. The array antenna A for transmitting the directional beam is shared among at least two adjacent sectors S1 and S2.

6 Claims, 12 Drawing Sheets

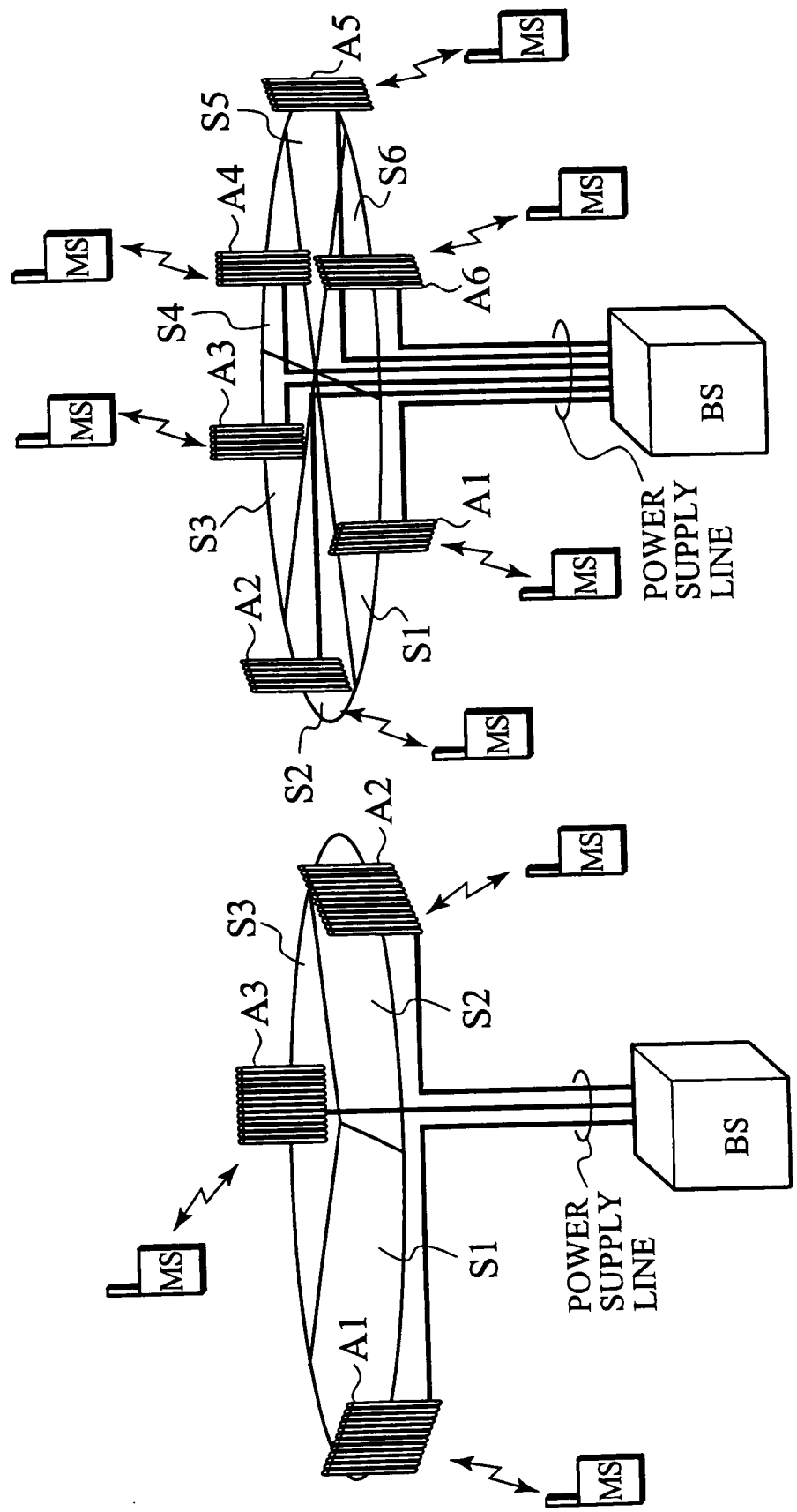

DIRECTIONAL BEAM COMMUNICATION SYSTEM, DIRECTIONAL BEAM COMMUNICATION METHOD, BASE STATION AND CONTROLLER

CROSS REFERENCE TO RELATED APPLICATION

This application is based upon and claims the benefit of priority from the prior Japanese Patent Application No. P2002-368865, filed on Dec. 19, 2002; the entire contents of which are incorporated herein by reference.

BACKGROUND OF THE INVENTION

1. Field of the Invention

The present invention relates to a directional beam communication system and a directional beam communication method for communicating with a mobile station located in a service area formed by a plurality of sectors using a directional beam which is transmitted by an array antenna including a plurality of antenna elements. Also the present invention relates to a base station and a controller which can used in the directional beam communication system and the directional beam communication method.

2. Description of the Related Art

A conventional mobile communication system applies a cellular system which covers a service area by arranging a plurality of base stations, each being associated to a cell.

The conventional mobile communication system employs a sector configuration in which a cell C is divided into a plurality of sectors S and a base station antenna is installed in each sector, so as to constitute the service area.

Generally, the conventional mobile communication system applies a three-sector configuration in which a cell C is divided into three sectors S as shown FIG. 1A, or a six-sector configuration in which a cell C is divided into six sectors S as shown FIG. 1B.

A technology for transmitting a directional beam by an adaptive array antenna is known as a technology to reduce interference on a mobile station caused by other mobile stations, in a mobile communication system.

The technology can reduce the interference power caused by another mobile station, by transmitting a directional beam using a plurality of antennas, and combining signals inputted to each of the antennas in accordance with proper weight values, so as to give directivity to signals to be transmitted.

For example, in the DS-CDMA (Direct Sequence Code Division Multiple Access) radio access system, a CAAAD (Coherent Adaptive Antenna Array Diversity) reception method using a pilot symbol in the uplink has been proposed.

An adaptive antenna array transmission method for compensating for a beam pattern formed in an uplink for amplitude and phase fluctuations of RF transmitter and receiver circuitries, and transmitting a directional beam having the compensated beam pattern in a downlink is known in the conventional mobile communication system.

The adaptive antenna array transmission method can reduce the interference power caused by another mobile station in the same sector and the interference power caused by another mobile station in another cell or sector, by transmitting the directional beam in the downlink.

Broadly speaking, there are two types of downlink channels in the conventional mobile communication station. One is a dedicated channel for transmitting individual information specific to each mobile station, and another is a common channel for transmitting control information common to all mobile stations in a sector.

FIG. 2A shows examples of beam patterns B1 and B2 of a beam for transmitting dedicated channels in the downlink. As shown in FIG. 2A, the base station BS transmits a directional beam having the beam pattern B1 to a mobile station MS#1 using an array antenna A, and the base station BS transmits a directional beam having the beam pattern B2 to a mobile station MS#2 using the array antenna A.

To be more specific, the base station BS narrows the beam of the dedicated channel for each mobile station MS#1 or MS#2 by the directional beam transmission, so that the interference power between the mobile stations MS#1 and MS#2 can be reduced.

On the other hand, FIG. 2B shows an example of beam pattern B3 of a beam for transmitting common channels in the downlink. As shown in FIG. 2B, the base station BS transmits a non-directional beam having the beam pattern B3 to the mobile stations MS#1 and MS#2 using the array antenna A.

Since the common channel for transmitting control information needs to be received by all mobile stations in the same sector, the common channel is transmitted by the non-directional beam as shown in FIG. 2B. The common channel can be transmitted by the sector antenna installed independent of the array antenna.

As shown in FIG. 3A, the base station which applies the adaptive antenna array transmission method is configured to have array antennas A1 to A3 for respective sectors S1 to S3, and to transmit the directional beam in accordance with weight values created for each sector independently.

Generally, the number of antenna elements which can be installed per cell is limited by a restriction of an installation condition of the base station BS.

For example, when a cell C includes six or more sectors (S1 to S6) as shown in FIG. 3B, the conventional adaptive antenna array transmission method arranges six antenna elements a1 or a2 at half wavelength intervals linearly as shown in FIGS. 4A and 4B, so as to form a directional beam with a beam width of 17° and to transmit the formed directional beam.

FIGS. 4A and 4B show only two adjacent sectors in the case where the number of antenna elements a1 or a2 of the array antenna A1 or A2 per sector S1 or S2 is six in the six-sector configuration. The horizontal beam width of the antenna element a1 is assumed to be 60°.

However, when the number of sectors S is large as described above, the number of antenna elements a1 or a2 of the array antenna A1 or A2 per sector S1 or S2 is small, so that the beam width of the directional beam transmitted by the array antenna A1 or A2 is increased. This results in a problem in that the interference suppression effect is reduced.

Especially, when a CDMA (Code Division Multiple Access) system is used as the radio access system, the base station generally spreads and modulates downlink signals using a scrambling code specific for identifying each sector and a channelization code for identifying each channel within each sector.

At this time, the channelization code generally employs an orthogonal code, and the orthogonality between channels using a same scrambling code can be maintained. Accordingly, the interference caused between the channels can be controlled to be small.

Herein, in the case of the three-sector configuration, since the number of antenna elements of the array antenna per sector is comparatively large, and the directional beam transmitted by the array antenna has a small beam width, so that a large interference suppression effect can be obtained.

The number of channelization codes is N if the spreading factor of the channelization code is N. Herein, in the case where N or more channels are accommodated in a sector, there is a shortage of channelization codes, and it is necessary to communicate using a plurality of scrambling codes within a same sector for identifying channels.

However, when the plurality of scrambling codes are used within a same sector, interference is caused between channels to which different scrambling codes are assigned, and this results in a problem in that the system capacity is reduced.

On the other hand, in the case of the six-sector configuration, the area per sector is half of that in the case of the three-sector configuration, so that the number of mobile stations accommodated per sector is half. Therefore, there is no shortage of channelization codes.

However, since the number of antenna elements of the array antenna per sector is reduced as previously described, the beam width of the directional beam transmitted by the array antenna is increased, thus resulting in a reduced interference suppression effect.

BRIEF SUMMARY OF THE INVENTION

In view of the foregoing, it is an object of the present invention to provide a directional beam communication system and a directional beam communication method, a base station and a controller whereby the beam width of a directional beam to be transmitted is reduced by sharing an array antenna among a plurality of adjacent sectors so as to increase the interference suppression effect and the system capacity while securing the number of channelization codes assigned to mobile stations.

A first aspect of the present invention is summarized as a directional beam communication system for communicating with a mobile station located in a service area formed by a plurality of sectors using a directional beam which is transmitted by an array antenna including a plurality of antenna elements. The array antenna for transmitting the directional beam is shared among at least two adjacent sectors.

A second aspect of the present invention is summarized as a directional beam communication method for communicating with a mobile station located in a service area formed by a plurality of sectors using a directional beam which is transmitted by an array antenna including a plurality of antenna elements. The array antenna for transmitting the directional beam is shared among at least two adjacent sectors.

A third aspect of the present invention is summarized as a base station for communicating with a mobile station located in a service area formed by a plurality of sectors using a directional beam which is transmitted by an array antenna including a plurality of antenna elements. The array antenna for transmitting the directional beam is shared among at least two adjacent sectors.

In the third aspect, the base station may include a receiver configured to acquire reception quality information for a common channel which is measured by the mobile station; and a spreading modulator configured to perform a spreading modulation using a scrambling code. The scrambling code is assigned to downlink dedicated channels of the mobile station according to the location of the mobile station specified by the reception quality information.

In the third aspect, the common channel may be transmitted by a sector antenna installed independently of the array antenna. The sector antenna is installed for said each sector.

In the third aspect, the base station may include a DOA estimator configured to estimate the direction of arrival of a signal transmitted from the mobile station; and a spreading modulator configured to perform a spreading modulation using a scrambling code. The scrambling code is assigned to downlink dedicated channels of the mobile station according to the location of the mobile station specified by the direction of arrival.

A fourth aspect of the present invention is summarized as a controller for controlling a base station for communicating with a mobile station located in a service area formed by a plurality of sectors using a directional beam which is transmitted by an array antenna including a plurality of antenna elements. The controller includes a location specifier configured to specify the location of the mobile station in accordance with a reception quality of a common channel in the mobile station or the direction of arrival of a signal transmitted from the mobile station; a scrambling code assigner configured to assign a scrambling code to downlink dedicated channels of the mobile station; and a notifier configured to notify the assigned scrambling code to the base station.

BRIEF DESCRIPTION OF THE SEVERAL VIEWS OF THE DRAWINGS

FIGS. 3A and 3B are explanatory views showing conventional configurations of a base station.

DETAILED DESCRIPTION OF THE INVENTION

First Embodiment

Figure 1B:
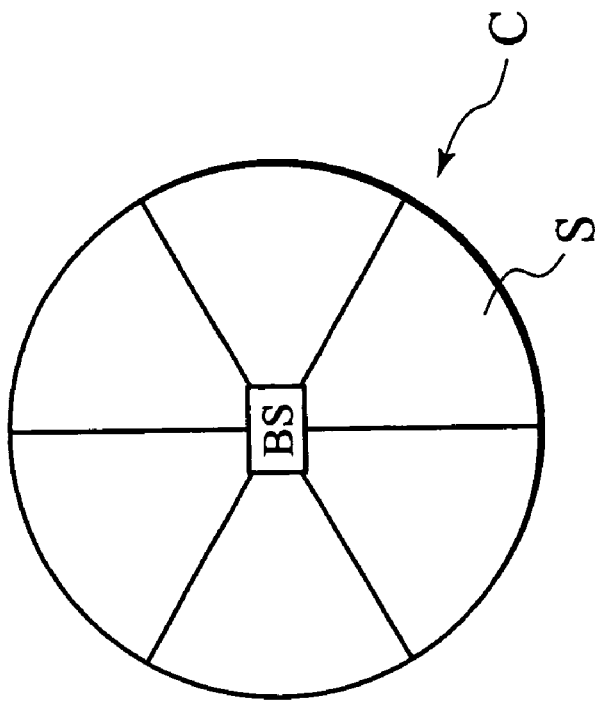
FIGS. 1A and 1B are explanatory views showing conventional sector configurations.
Figure 1A:
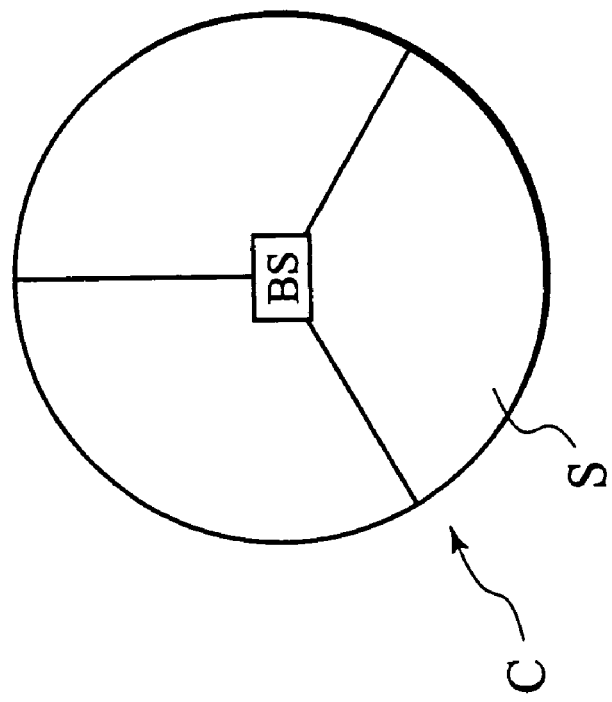
Figure 2B:
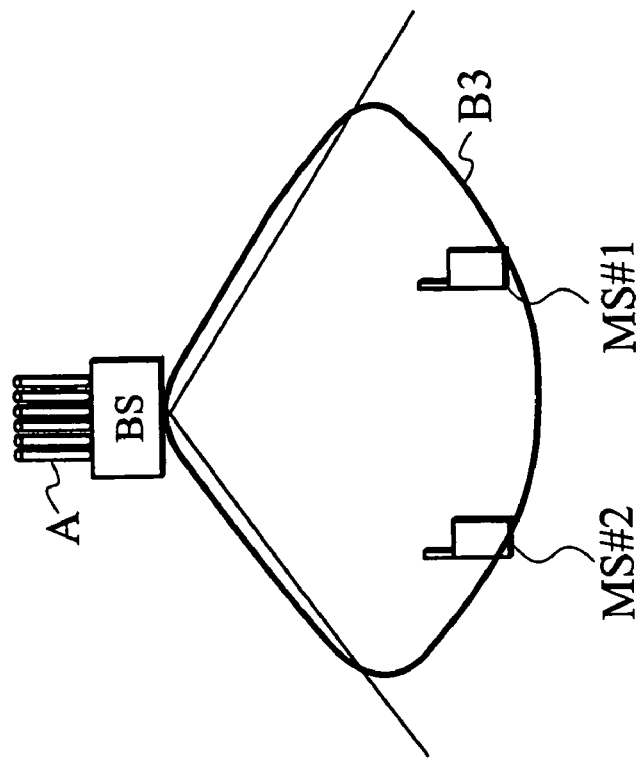
FIGS. 2A and 2B are explanatory views showing conventional beam patterns of a beam transmitted in a downlink.
Figure 2A:
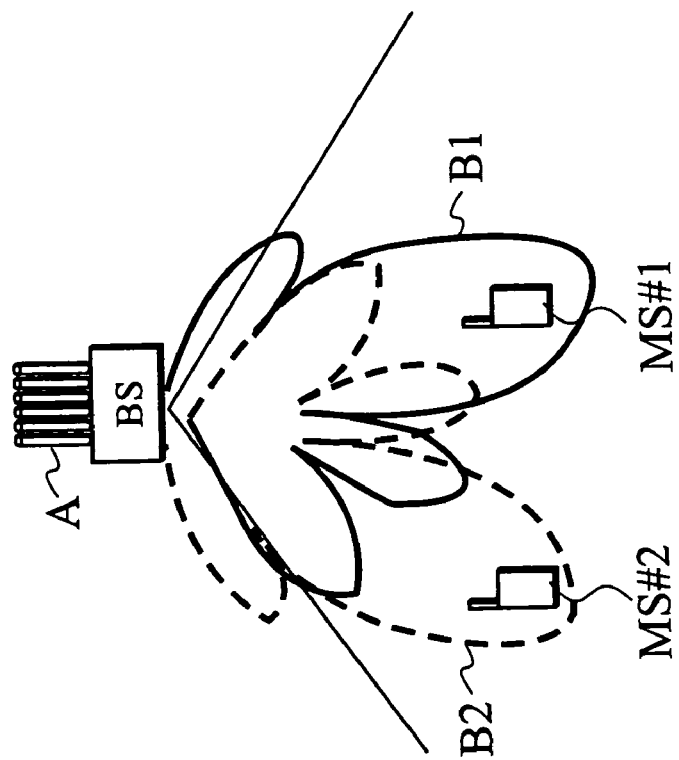
Figure 4B:
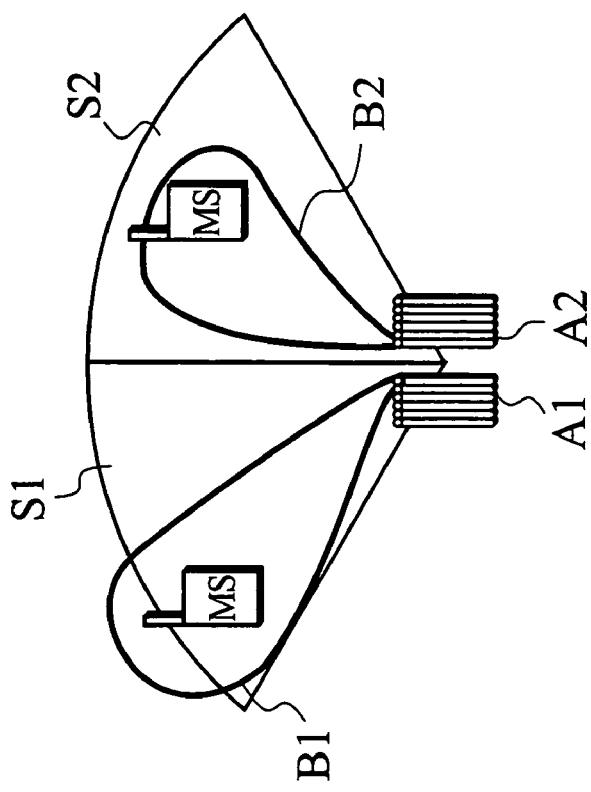
FIG. 4B is an explanatory view showing horizontal beam patterns transmitted by antenna elements of the base station applying the conventional directional beam transmission.
Figure 4A:
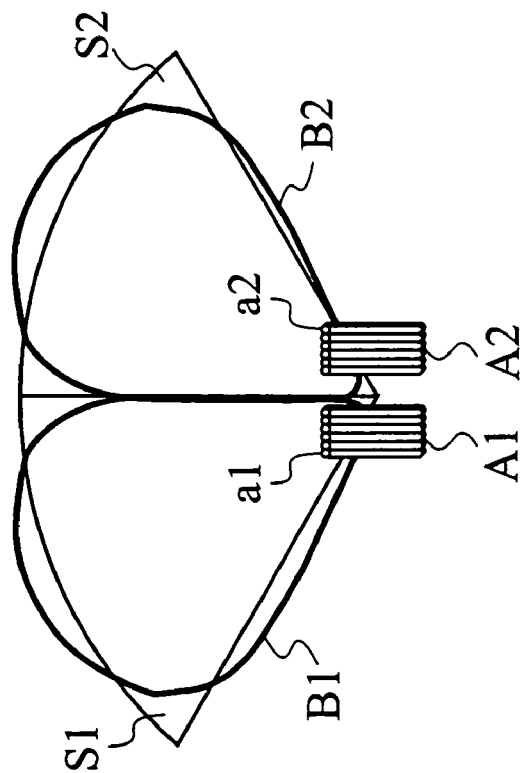
FIG. 4A is an explanatory view showing a horizontal beam pattern transmitted by an array antenna of a base station applying a conventional directional beam transmission.
Figure 5:
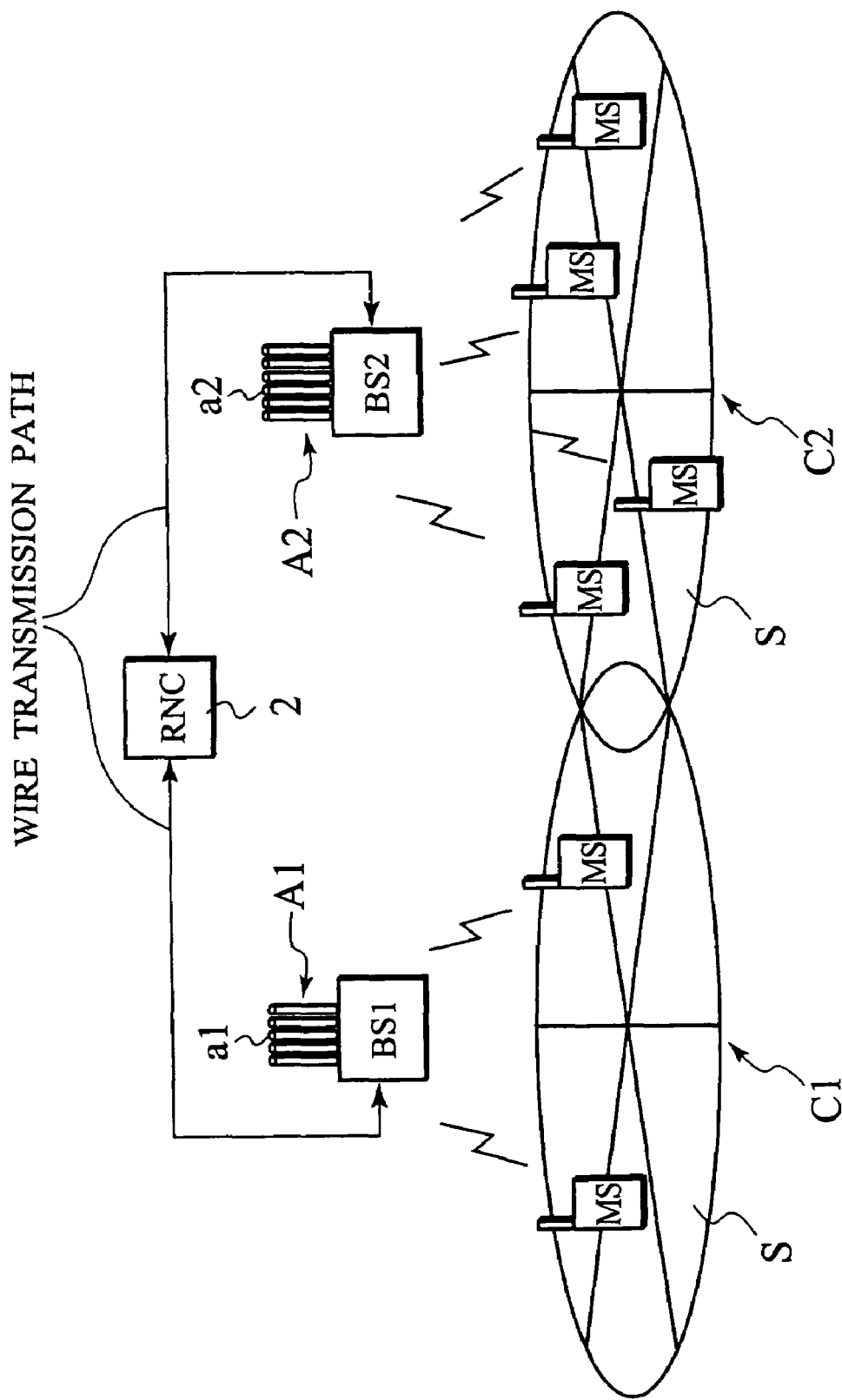
FIG. 5 is an explanatory view showing a configuration of a directional beam communication system according to a first embodiment.

Referring to FIG. 5 and FIG. 6, a description will be given of a first embodiment of the present invention. FIG. 5 shows a configuration of a directional beam communication system according to a first embodiment.

As shown in FIG. 5, the directional beam communication system according to the first embodiment includes a plurality of mobile stations MS located in cells C1 and C2, a plurality of base stations BS1 and BS2 installed to correspond to a plurality of cells S1 and S2 respectively, and a radio network controller (RNC) 2 connected to the base stations BS1 and BS2.

The radio network controller 2 is connected to the plurality of base stations BS1 and BS2 by wire transmission paths. The radio network controller 2 is configured to perform location registration management of each mobile station MS, assignment of scrambling codes, and the like for the base stations BS1 and BS2.

The base station BS1 includes an array antenna A1 composed of a plurality of antenna elements a1 in each sector, and the base station BS2 includes an array antenna A2 composed of a plurality of antenna elements a2 in each sector.

Each of the base stations BS1 and BS2 communicates with the mobile stations MS located in the plurality of sectors within a service area, using a directional beam transmitted by each of the array antennas A1 and A2.

In a conventional directional beam communication system, each array antenna includes six antenna elements per sector. The total number of antenna elements of the array antenna per cell is 36 in a total of six sectors.

Figure 6B:
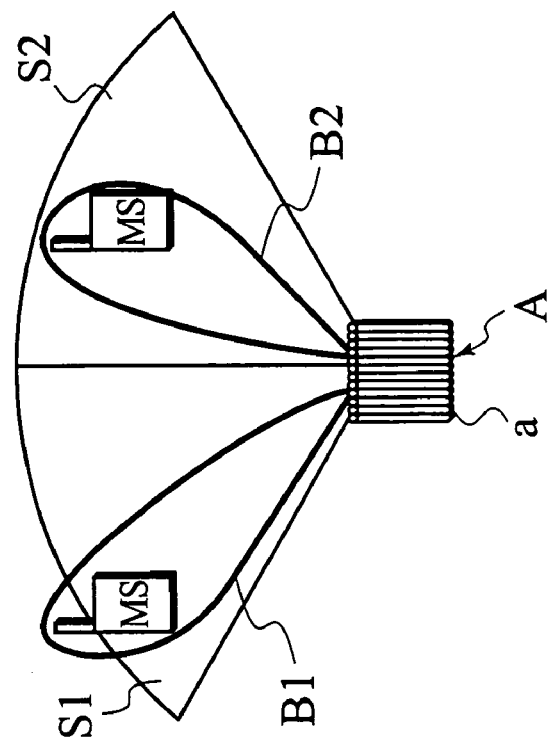
FIG. 6B is an explanatory view showing a horizontal beam pattern transmitted by an array antenna of a base station according to the first embodiment.
Figure 6A:
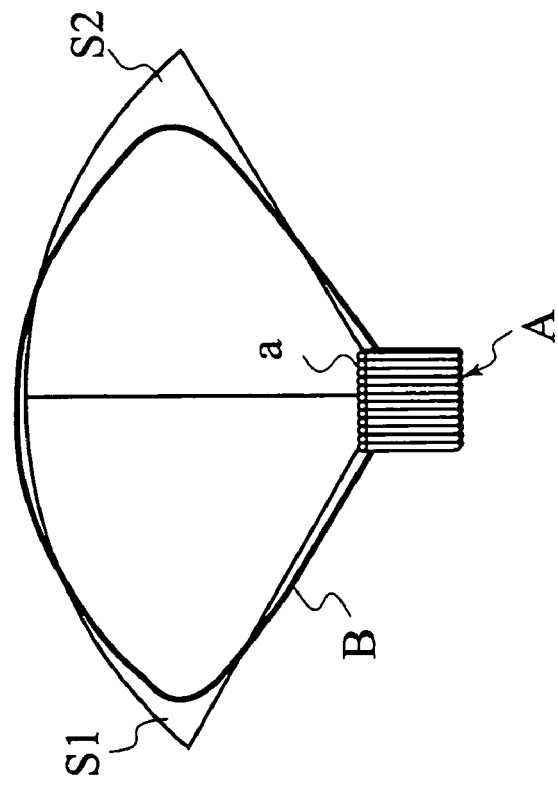
FIG. 6A is an explanatory view showing horizontal beam patterns transmitted by antenna elements of the base station according to the first embodiment.

In the first embodiment, particularly, as shown in FIG. 6A, each antenna element a has a horizontal beam width of 120° to cover two sectors S1 and S2, and a 12-element array antenna A is shared between the two adjacent sectors S1 and S2 in each of the base stations BS1 and BS2.

Specifically, as shown in FIG. 6B, the twelve antenna elements a are linearly arranged at half wavelength intervals, so as to form a directional beam with a beam width of 8.5°, and to transmit the formed directional beam.

According to the first embodiment, the directional beam communication system can increase the interference suppression effect, by sharing the array antenna A with many antenna elements a among the plurality of sectors S1 and S2, and narrowing the horizontal beam pattern of the directional beam.

Second Embodiment

Referring to FIGS. 7A to 10, a description will be given of a second embodiment of the present invention.

Figure 7A:
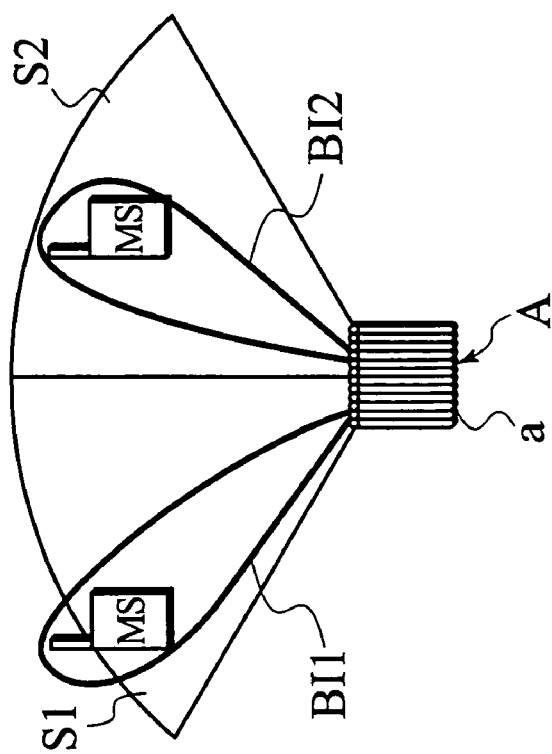
FIG. 7A is an explanatory view showing horizontal beam patterns transmitted by a sector antenna of the base station according to the second embodiment.

FIG. 7A shows an example of horizontal beam patterns and scrambling codes of common channels transmitted by the base station according to the second embodiment.

Figure 7B:
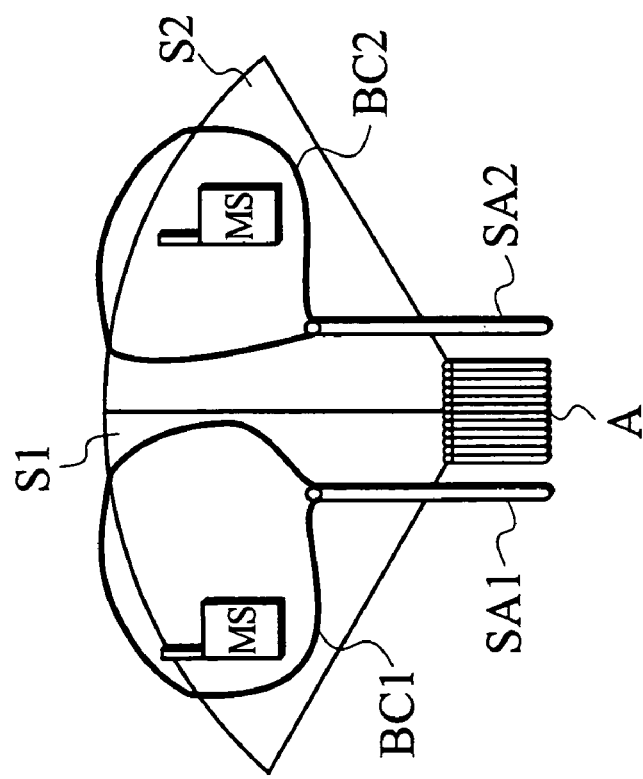
FIG. 7B is an explanatory view showing a horizontal beam pattern transmitted by an array antenna of a base station according to a second embodiment.

FIG. 7B shows an example of horizontal beam patterns and scrambling codes of dedicated channels transmitted by the base station according to the second embodiment.

As shown in FIG. 7A, the common channels are transmitted by sector antennas SA1 and SA2 installed independently of the array antennas A for the respective sectors S1 and S2, in the second embodiment.

The beam patterns of these sector antennas SA1 and SA2 have a beam width of 60°. The sectors S1 and S2 are assigned with respective specific scrambling codes #1 and #2.

In the second embodiment, the base station MS is configured to measure a reception quality (for example, received signal power) of each of common pilot channels (CPICH) transmitted to each of a plurality of sectors S1 and S2. The radio network controller 2 is configured to select the sector whose common pilot channel has the best reception quality as the sector where the mobile station MS is located.

Specifically, the mobile station MS measures the reception quality of each common pilot channel and notifies the radio network controller 2 of the result of the reception quality measurement through the base station BS. The radio network controller 2 determines the sector where the mobile station MS is located.

The radio network controller 2 is configured to assign a scrambling code specific to the sector where each mobile station MS is located to a dedicated channel of the mobile station MS.

As shown in FIG. 7B, the base station BS is configured to transmit the dedicated channel assigned with the scrambling code specific to the sector where the mobile station MS is located to the mobile station MS in the downlink using the directional beam.

Figure 8:
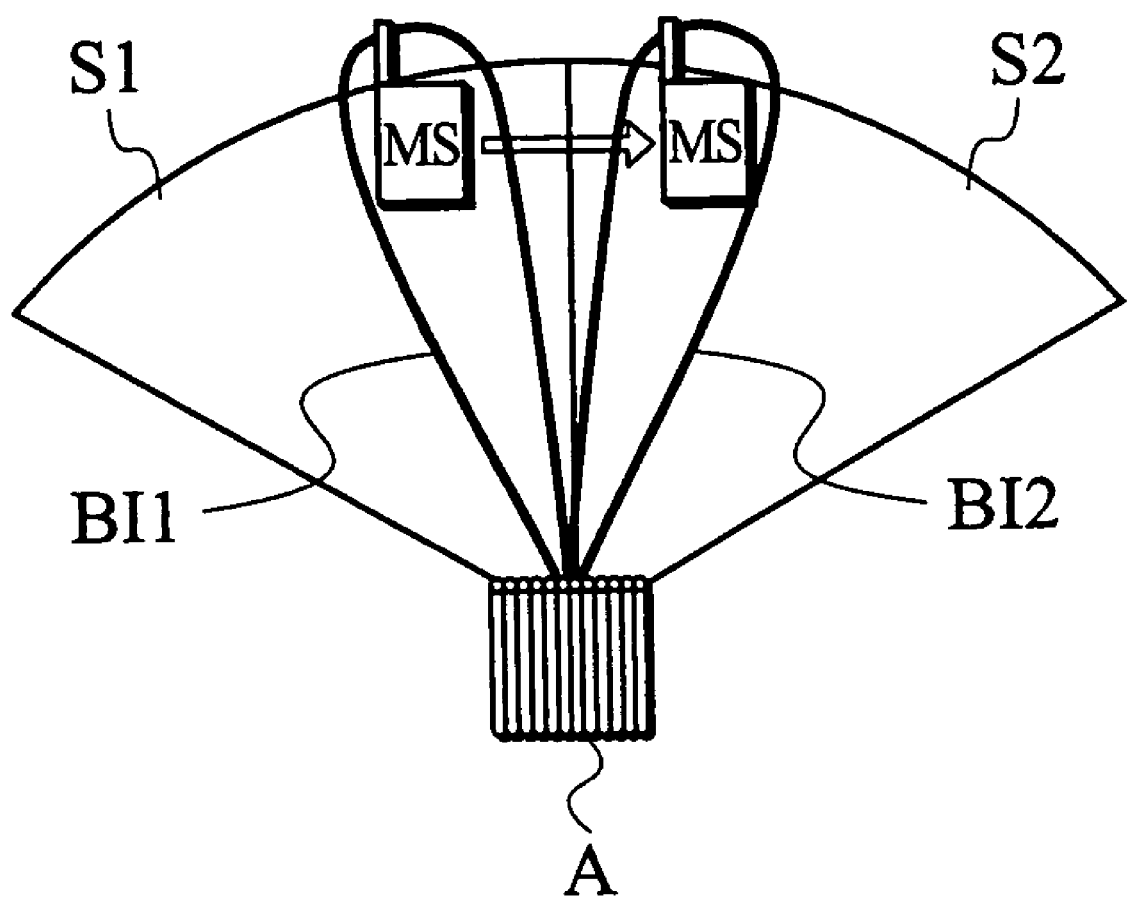
FIG. 8 is an explanatory view showing a scrambling code change control between sectors sharing an array antenna of the base station according to the second embodiment.

Furthermore, in the second embodiment, as shown in FIG. 8, in the case where a mobile station MS moves from a sector S1 to a sector S2, and the mobile station MS detects a change of the sector where the mobile station MS is located according to the reception qualities of the common pilot channels transmitted to the sectors S1 and S2, the radio network controller 2 changes the scrambling code #1 specific to the sector S1 to the scrambling code #2 specific to the sector S2. Herein, the sectors S1 and S2 share the array antenna A.

At this time, the weight values (antenna values) of the directional beam are continuously updated without consideration to the change in the scrambling code.

(Configuration of Direction Beam Communication System)

Figure 9:
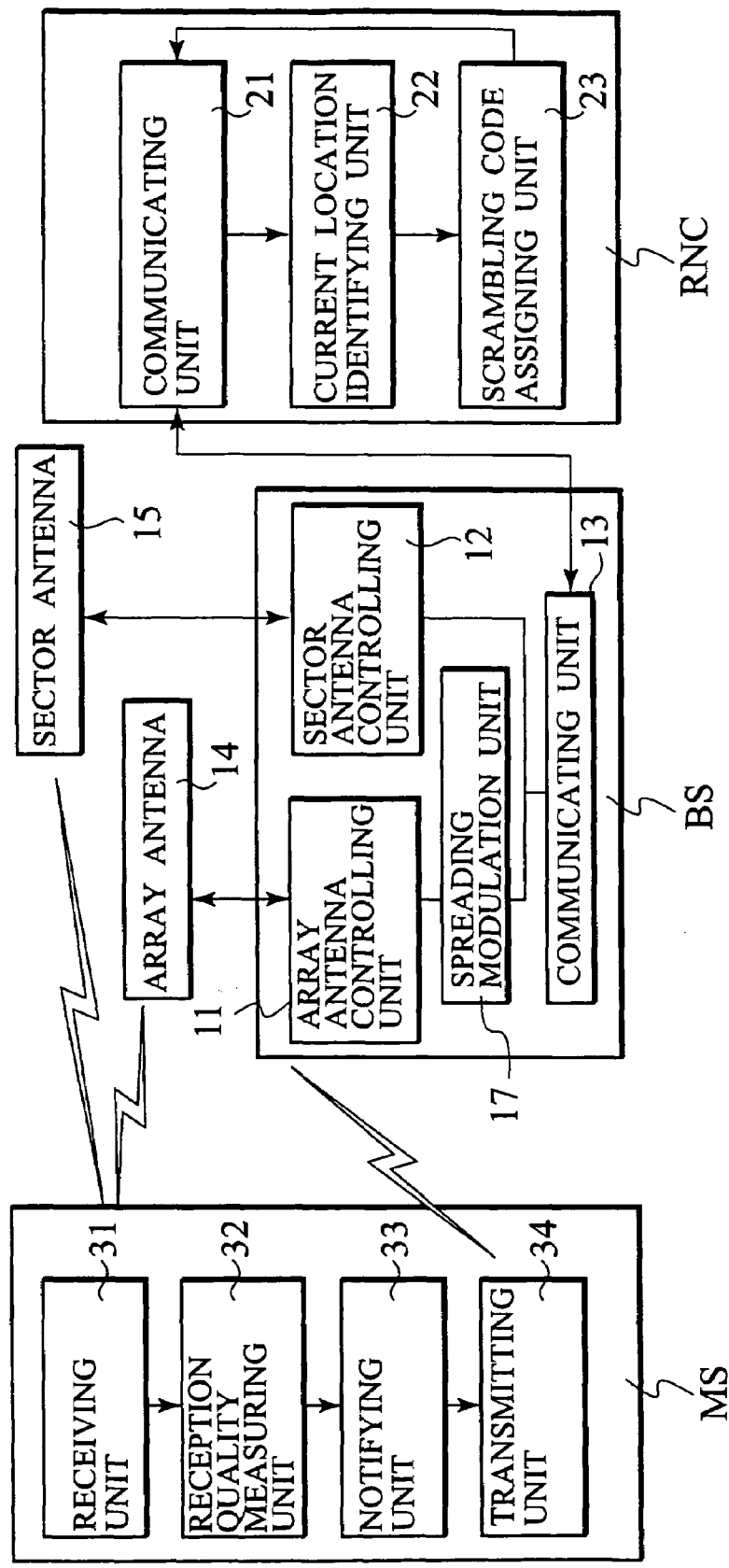
FIG. 9 is a block diagram showing a configuration of the directional beam communication system according to the second embodiment.

FIG. 9 is a block diagram showing a configuration of a directional beam communication system according to the second embodiment.

As shown in FIG. 9, the mobile station MS includes a receiving unit 31, a reception quality measuring unit 32, a notifying unit 33 and a transmitting unit 34.

The receiving unit 31 is configured to receive common channels and dedicated channels transmitted from a plurality of base stations BS.

The reception quality measuring unit 32 is configured to measure a reception quality of the received common channel.

The notifying unit 33 is configured to notify the radio network controller 2 of reception quality information measured by the reception quality measuring unit 32 from a transmitting unit 34 through the base station BS.

The radio network controller 2 is configured to control the base stations BS. As shown in FIG. 9, the radio network controller 2 includes a communicating unit 21, a current location identifying unit 22, and a scrambling code assigning unit 23.

The communicating unit 21 is configured to transmit data to each base station BS via wire transmission paths, and to receive data from each base station BS via wire transmission paths.

The current location identifying unit 22 is configured to identify the current location of each mobile station MS, based on the reception quality information for the common channel notified by the mobile station MS.

The scrambling code assigning unit 23 is configured to assign the scrambling code based on the identified current location.

The communication unit 21 notifies the scrambling code assigned by the scrambling code assigning unit 23 to each base station BS.

A base station BS is configured to communicate with a mobile station MS located in a service area formed by a plurality of sectors S, using a directional beam which is transmitted by an array antenna A including a plurality of antenna elements a.

As shown in FIG. 9, the base station BS includes an array antenna controlling unit 11, a sector antenna controlling unit 12, a communicating unit 13, and a spreading modulation unit 17.

The array antenna controlling unit 11 is configured to control which sectors share the array antenna 14. The array antenna controlling unit 11 is configured to allow the array antenna 14 to perform directional beam transmission and reception.

The sector antenna controlling unit 12 is configured to control the sector antenna 15. One or several sector antennas 15 are provided independently of the array antenna 14 and installed so as to correspond to a plurality of sectors. The common channel is transmitted and received through this sector antenna 15.

The communicating unit 13 is configured to transmit data to the radio network controller 2 through the wire transmission paths, and to receive data from the radio network controller 2 through the wire transmission paths.

For example, the communicating unit 13 acquires reception quality information for a common channel which is measured by the mobile station MS.

The spreading modulation unit 17 is configured to perform a spreading modulation using the specific scrambling code assigned to the sector where the mobile station MS is located.

(Behavior of Directional Beam Communication System)

Figure 10:
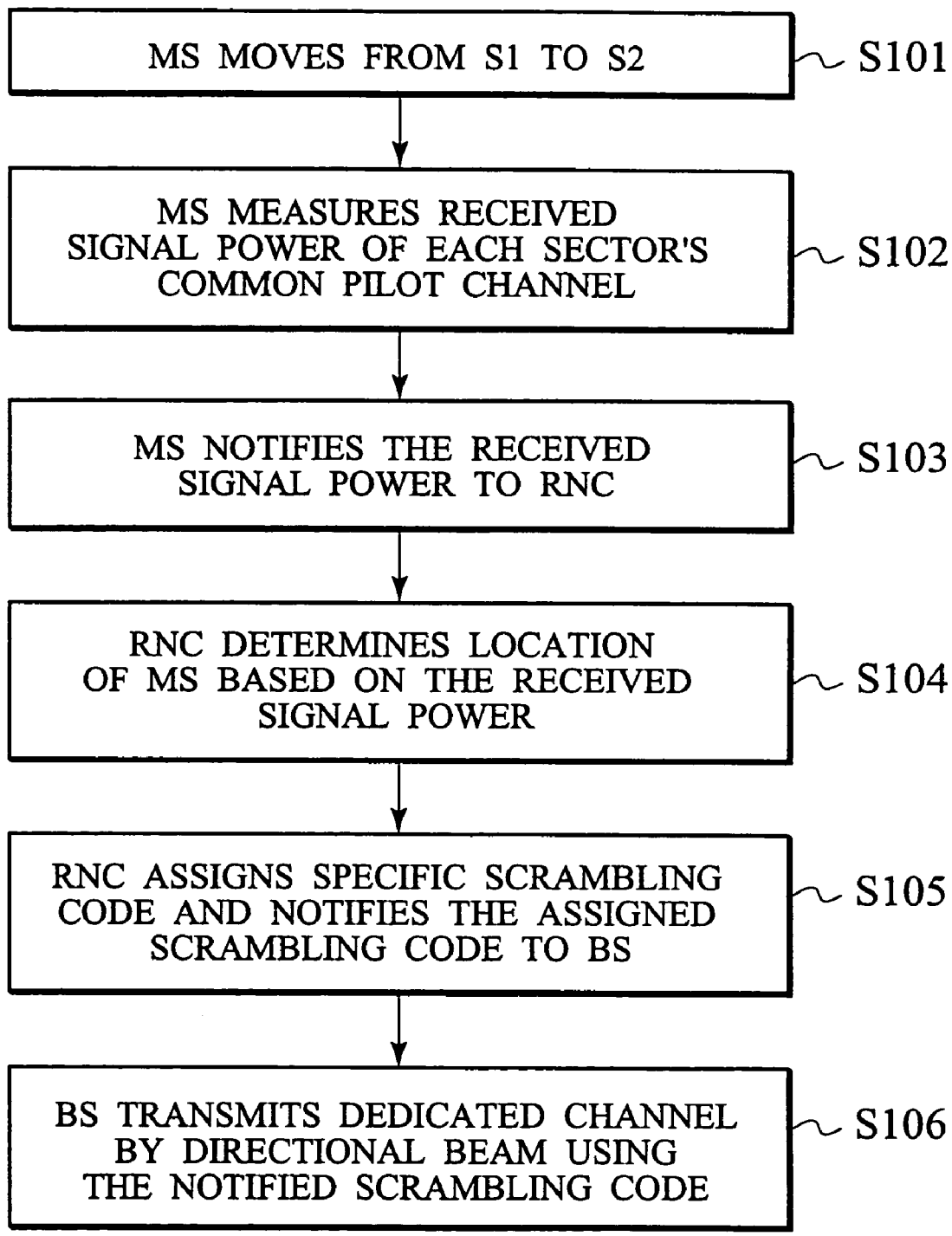
FIG. 10 is a flowchart showing an operation of the directional beam communication system according to the second embodiment.

FIG. 10 is a flowchart showing a control processing of changing a scrambling code in the directional beam communication system according to the second embodiment.

As shown in FIG. 10, when the mobile station MS moves from the sector S1 to the sector S2 in step 101, the reception quality measuring unit 32 of the mobile station MS measures the received signal power of the common pilot channel of each sector S1 and S2 in step 102.

In step 103, the notifying unit 33 of the mobile station MS notifies the measured received signal power to the communicating unit 21 of the radio network controller 2 through the base station BS.

In step 104, the current location identifying unit 22 of the radio network controller 2 determines the current location of the mobile station MS, in accordance with the notified received signal power of the mobile station.

In step 105, the scrambling code assigning unit 23 assigns the specific scrambling code to the current location (sector), and the communicating unit 21 notifies the assigned scrambling code to each of the base stations BS.

In step 106, the communicating unit 13 of the base station receives the notification from the radio network controller 2, and the spreading modulation unit 17 performs a spreading modulation using the scrambling code notified by the radio network controller 2.

The array antenna controlling unit 11 controls sharing of the array antenna 14, so as to transmit the dedicated channel using the directional beam.

(Operation and Effect of Directional Beam Communication System)

With the directional beam communication system according to the second embodiment, sharing of the array antenna 14 among the plurality of sectors allows an increase in the number of antenna elements used per sector.

Accordingly, the beam width of the directional beam can be narrowed, and the interference suppression effect can be increased.

In the second embodiment, the reception quality measuring unit 32 of the mobile station MS measures the reception quality of each common pilot channel. The radio network controller 2 identifies the current location of the mobile station MS in accordance with the measured reception quality, and controls sharing of the array antenna 14 in accordance with the identified current location.

Accordingly, the directional beam transmission and reception can be efficiently performed in accordance with the reception environment of the mobile station MS.

Moreover, in the second embodiment, the common channel is transmitted through the sector antenna 15 provided independently of the array antenna 14.

Accordingly, the common channel and the dedicated channel can be controlled as different beam patterns, and various controls of the directional beam can be achieved depending on the communication environment.

Furthermore, in the second embodiment, each sector is assigned with a specific scrambling code. Accordingly, even when the array antenna 14 is shared among adjacent sectors, there is no shortage of channelization codes, and a large number of channels to be assigned to the mobile stations MS can be secured.

Third Embodiment

Figure 11:
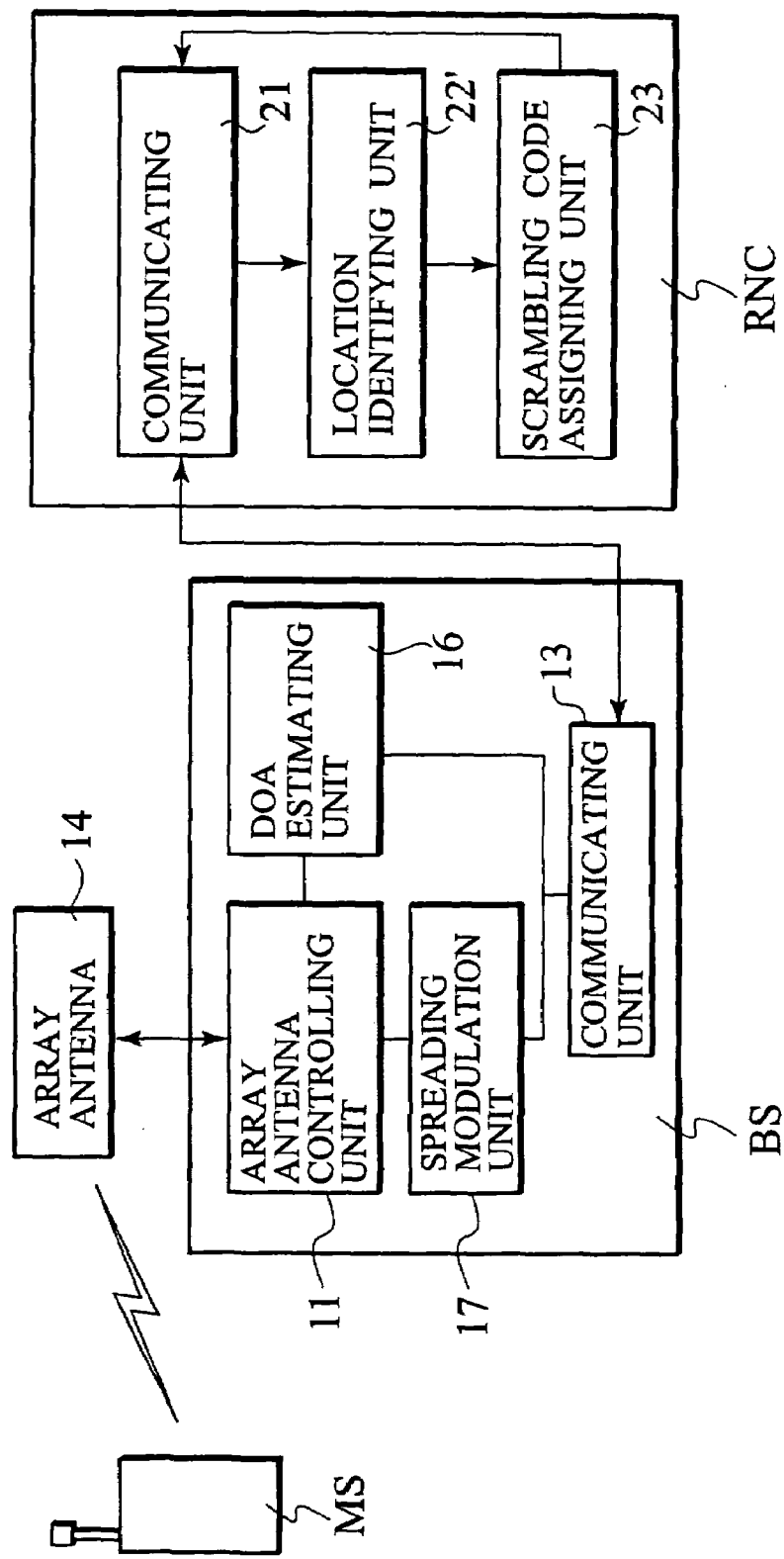
FIG. 11 is a block diagram showing a configuration of a directional beam communication system according to a third embodiment.
Figure 12:
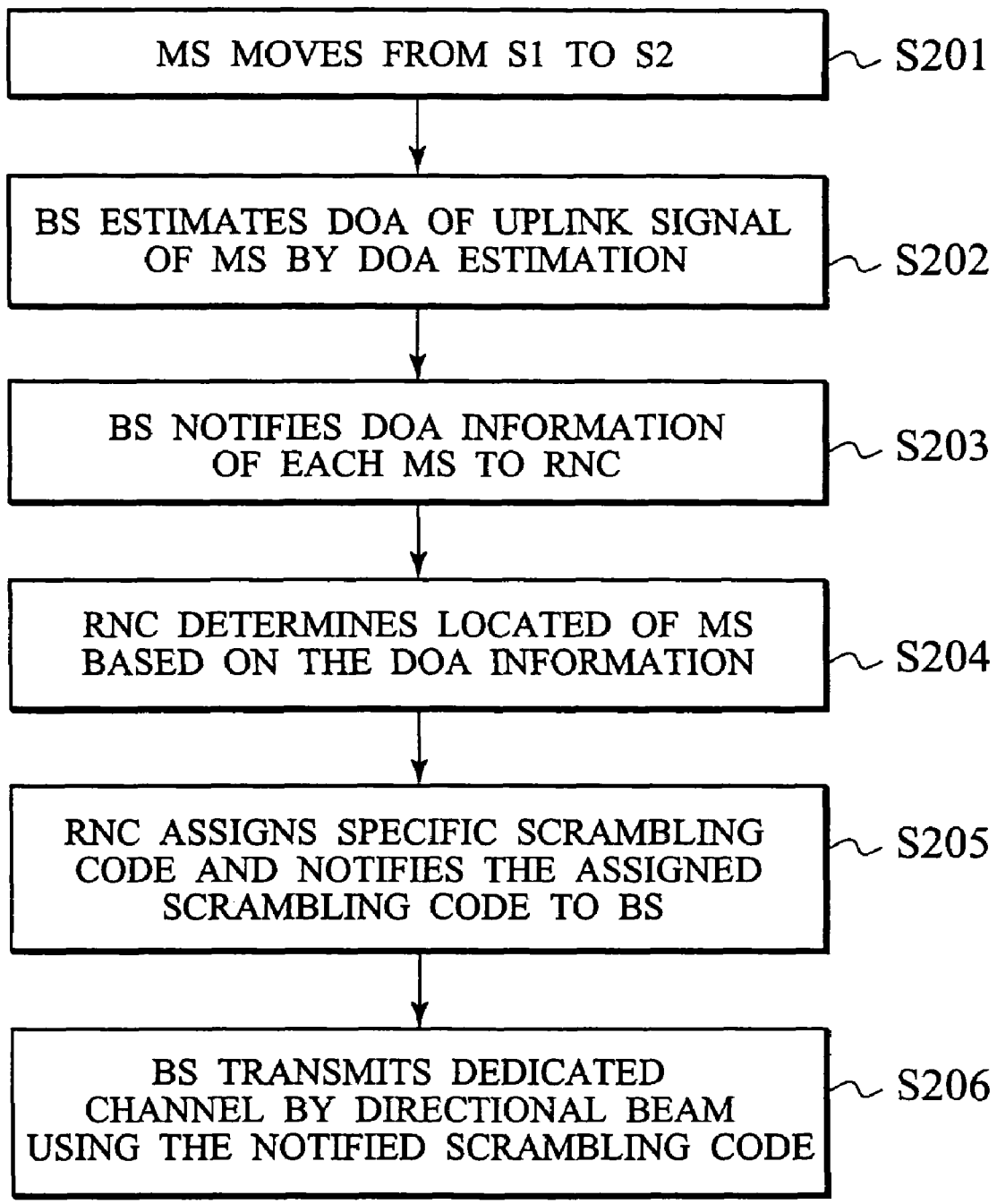
FIG. 12 is a flowchart showing an operation of the directional beam communication system according to the third embodiment.

Referring to FIGS. 11 and 12, a description will be given of a third embodiment of the present invention.

In the third embodiment, the base station BS is configured to estimate the direction of arrival (DOA) of a signal transmitted from each mobile station, using an uplink signal received in each array antenna. The radio network controller 2 is configured to determine a sector where the mobile station MS is located based on the estimated the DOA.

Specifically, the base station BS estimates the DOA of each mobile station MS, and notifies the estimated DOA to the radio network controller 2.

The radio network controller 2 determines the sector where the mobile station MS is located. The radio network controller assigns the scrambling code specific to the determined sector to the dedicated channel of each mobile station MS.

Subsequently, the base station BS transmits the dedicated channel assigned with the scrambling code specific to the determined sector to each user in the downlink, using a directional beam.

Herein, in the method of estimating the DOA, for example, a main lobe of the array antenna in the base station BS is omni-directionally scanned every unit step angle (for example, 1°), and the direction with the largest reception power is determined as the estimated DOA.

When the mobile station MS moves from the sector S1 to the sector S2 which share an array antenna, and when the DOA of the uplink signal transmitted from the mobile station MS exceeds the direction (angle) corresponding to the predetermined border between the sectors, the radio network controller 2 changes the scrambling code. Herein, the DOA of the uplink signal is obtained by the DOA estimation.

(Configuration of Directional Beam Communication System)

FIG. 11 is a block diagram showing the configuration of the directional beam communication system according to the third embodiment. In the third embodiment, the mobile station MS does not need to have a particular configuration and can be implemented by a known device.

As shown in FIG. 11, the base station BS includes an array antenna controlling unit 11, a DOA estimating unit 16, a communicating unit 13, and a spreading modulation unit 17.

The array antenna controlling unit 11 is configured to control the array antenna 14 so as to perform directional beam transmission and reception and the sharing of the array antenna 14.

The communicating unit 13 is configured to transmit data to the radio network controller 2 through the wire transmission paths and to receive data from the radio network controller 2 through the wire transmission paths.

The DOA estimating unit 16 is configured to estimate the direction of arrival of a signal transmitted from the mobile station MS.

The spreading modulation unit 17 is configured to perform a spreading modulation using a scrambling code. Herein, the scrambling code is assigned to a sector where the mobile station MS is located according to the location of the mobile station MS specified by the estimated direction of arrival.

As shown in FIG. 11, the radio network controller 2 includes a communicating unit 21, a current location identifying unit 22', and a scrambling code assigning unit 23.

The communicating unit 21 is configured to transmit data to each base station BS through the wire transmission paths and to receive data from each base station BS through the wire transmission paths.

The current location identifying unit 22' is configured to identify the current location of each mobile station MS based on the direction of arrival of a signal transmitted from the mobile station MS.

The scrambling code assigning unit 23 is configured to assign the scrambling code to a sector where the mobile station is located, based on the identified current location.

The scrambling code assigned by the scrambling code assigning unit 23 is notified through the communicating unit 21 to each base station BS.

(Behavior of Directional Beam Communication System)

FIG. 12 is a flowchart showing a control processing of changing a scrambling code in the directional beam communication system according to the third embodiment.

As shown in FIG. 12, when the mobile station MS moves from the sector S1 to S2 in step 201, the DOA estimating unit 16 of the base station BS estimates the DOA of the uplink signal of each mobile station MS in step 202.

In step 203, the communicating unit 13 of each base station BS notifies the estimated DOA to the communicating unit 21 of the radio network controller 2.

In step 204, the communicating unit 21 of the radio network controller 2 receives the notified DOA, and the current location identifying unit 22' determines a sector where the mobile station MS is located based on the DOA notified by the base station BS.

In step 205, the scrambling code assigning unit 23 assigns the specific scrambling code to the sector where the mobile station MS is located. The communicating unit 21 notifies the assigned scrambling code to each base station BS.

In step 206, the communication unit 13 of each base station BS receives the scrambling code notified by the radio network controller 2. The spreading modulation unit 17 performs a spreading modulation using the scrambling code notified by the radio network controller 2. The array antenna controlling unit 11 controls sharing of the array antenna so as to transmit the dedicated channel using the directional beam.

(Operation and Effect of Directional Beam Communication System)

With the directional beam communication system according to the third embodiment, the number of antenna elements used per sector can be increased by sharing the array antenna 14 among the plurality of sectors.

As a result, the beam width of the directional beam can be narrowed, and the interference suppression effect can be increased.

Especially in the third embodiment, the DOA estimating unit 16 estimates the DOA of the signal transmitted from the mobile station MS, and the current location of the mobile station MS is identified based on the estimated DOA.

Accordingly, the current location of the mobile station MS can be identified more precisely, and the directional beam transmission and reception can be efficiently performed according to the current location of the mobile station MS.

Note that in the third embodiment, each sector is assigned with a specific scrambling code. Therefore, even when the array antenna 14 is shared among adjacent sectors, there is no shortage of channelization codes, and assignment of a large number of channels to the mobile stations MS can be secured.

As described above, according to the present invention, in the sector configuration including many sectors, sharing of an array antenna among a plurality of adjacent sectors allows the directional beam to have a narrower horizontal beam width while securing the number of channelization codes to be assigned to mobile stations, so that the interference suppression effect can be increased. As a result, the system capacity of the directional beam communication system can be increased.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A directional beam communication system, comprising:
a base station operably linked to a radio network controller communicating with a mobile station located in a service area formed by a plurality of sectors, by using a directional beam of the base station which is transmitted by an array antenna including a plurality of antenna elements, wherein each sector is defined by an area identified with a scrambling code, and the base station being configured to store the array antenna and a plurality of scrambling codes in association with each other, and to select the array antenna associated with the scrambling code notified by the radio network controller for transmitting the directional beam, a respective one of the plurality of scrambling codes identifying each of at least two adjacent sectors.

2. A directional beam communication method, comprising:
communicating with a mobile station located in a service area formed by a plurality of sectors using a directional beam which is transmitted by an array antenna including a plurality of antenna elements, wherein each sector is defined by an area identified with a scrambling code,
storing the array antenna and a plurality of scrambling codes in association with each other, and
selecting the array antenna associated with the scrambling code notified by a radio network controller for transmitting the directional beam, a respective one of the plurality of scrambling codes identifying each of at least two adjacent sectors.

3. A base station for communicating with a mobile station located in a service area formed by a plurality of sectors, by using a directional beam which is transmitted by an array antenna including a plurality of antenna elements, wherein each sector is defined by an area identified with a scrambling code, comprising:
a memory configured to store the array antenna and a plurality of scrambling codes in association with each other, and
a controller configured to select the array antenna associated with the scrambling code notified by a radio network controller for transmitting the directional beam, a respective one of the plurality of scrambling codes identifying each of at least two adjacent sectors.

4. The base station according to claim 3 further comprising:
a receiver configured to acquire reception quality information for a common channel which is measured by the mobile station; and
a spreading modulator configured to perform a spreading modulation using the scrambling code, the scrambling code being assigned to downlink dedicated channels of the mobile station according to the location of the mobile station specified by the reception quality information.

5. The base station according to claim 4, wherein
the common channel is transmitted by a sector antenna installed independently of the array antenna, the sector antenna being installed for said each sector.

6. The base station according to claim 3 further comprising:
a DOA estimator configured to estimate the direction of arrival of a signal transmitted from the mobile station; and
a spreading modulator configured to perform a spreading modulation using the scrambling code, the scrambling code being assigned to downlink dedicated channels of the mobile station according to the location of the mobile station specified by the direction of arrival.

* * * * *